(12) United States Patent
Zhang et al.

(10) Patent No.: US 11,188,197 B2
(45) Date of Patent: *Nov. 30, 2021

(54) SIDE MENU DISPLAYING METHOD AND APPARATUS AND TERMINAL

(71) Applicant: Huawei Technologies Co., Ltd., Shenzhen (CN)

(72) Inventors: Zhenyong Zhang, Shenzhen (CN); Zhangquan Zhao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/844,413

(22) Filed: Apr. 9, 2020

(65) Prior Publication Data

US 2020/0233546 A1 Jul. 23, 2020

Related U.S. Application Data

(63) Continuation of application No. 14/586,325, filed on Dec. 30, 2014, now Pat. No. 10,691,298, which is a continuation of application No. PCT/CN2013/090980, filed on Dec. 30, 2013.

(51) Int. Cl.
*G06F 3/0482* (2013.01)
*G06F 3/0488* (2013.01)

(52) U.S. Cl.
CPC .......... *G06F 3/0482* (2013.01); *G06F 3/0488* (2013.01); *G06F 3/04883* (2013.01)

(58) Field of Classification Search
CPC ........ G06F 3/044; G06F 3/017; G06F 3/0416; G06F 3/04883; G06F 3/04886; G06F 3/0482
See application file for complete search history.

(56) References Cited

U.S. PATENT DOCUMENTS

| | | | |
|---|---|---|---|
| 8,046,721 B2 | 10/2011 | Chaudhri et al. | |
| 8,411,060 B1 | 4/2013 | Scholler et al. | |
| 9,767,080 B2 | 9/2017 | Imamura | |
| 2007/0157106 A1 | 7/2007 | Bishop | |

(Continued)

FOREIGN PATENT DOCUMENTS

| | | |
|---|---|---|
| CA | 2821093 A1 | 6/2012 |
| CN | 2002027055 A | 1/2002 |

(Continued)

OTHER PUBLICATIONS

"Notification Mod" enables a notification area to be pull down on the locked screen, Excite News, Japan, Android Smart, Nov. 9, 2013, 5 pages.

(Continued)

*Primary Examiner* — Eric J Yoon
(74) *Attorney, Agent, or Firm* — Conley Rose, P.C.

(57) ABSTRACT

A side menu displaying method receiving a sliding operation of sliding starting from a side of a screen; detecting whether the sliding operation meets a predefined condition, where the predefined condition includes that a sliding speed of the sliding operation is greater than a preset threshold, and an end position of the sliding operation is not within a preset false touch area; and displaying a side menu corresponding to the side of the screen if a detection result is that the sliding operation meets the predefined condition.

17 Claims, 6 Drawing Sheets

(56) References Cited

U.S. PATENT DOCUMENTS

| | | | |
|---|---|---|---|
| 2010/0011304 A1* | 1/2010 | van Os | G06F 3/04817 |
| | | | 715/762 |
| 2010/0302172 A1 | 12/2010 | Wilairat | |
| 2011/0205163 A1 | 8/2011 | Hinckley et al. | |
| 2012/0117507 A1 | 5/2012 | Tseng et al. | |
| 2012/0235926 A1 | 9/2012 | Sip | |
| 2012/0293456 A1 | 11/2012 | Ikeda et al. | |
| 2012/0326981 A1 | 12/2012 | Kurose | |
| 2013/0063383 A1* | 3/2013 | Anderssonreimer | G06F 3/0202 |
| | | | 345/173 |
| 2013/0283213 A1* | 10/2013 | Guendelman | G06F 3/04842 |
| | | | 715/848 |
| 2014/0365945 A1* | 12/2014 | Karunamuni | G06F 3/0485 |
| | | | 715/773 |
| 2015/0000025 A1 | 1/2015 | Clements | |
| 2015/0077395 A1 | 3/2015 | Ikeda et al. | |
| 2015/0169071 A1 | 6/2015 | Jitkoff | |

FOREIGN PATENT DOCUMENTS

| | | | | |
|---|---|---|---|---|
| CN | 101981987 A | | 2/2011 | |
| CN | 102609191 A | | 7/2012 | |
| CN | 102609199 | * | 7/2012 | G06F 3/041 |
| CN | 102609199 A | | 7/2012 | |
| CN | 102834791 A | | 12/2012 | |
| CN | 102855073 A | | 1/2013 | |
| CN | 103076973 A | | 5/2013 | |
| CN | 103235688 A | | 8/2013 | |
| CN | 103853477 A | | 6/2014 | |
| EP | 2045700 A1 | | 4/2009 | |
| JP | 2002055750 A | | 2/2002 | |
| JP | 2008191895 A | | 8/2008 | |
| JP | 2011516936 A | | 5/2011 | |
| JP | 2013520727 A | | 6/2013 | |
| JP | 2014044657 A | | 3/2014 | |
| KR | 100878196 B1 | | 1/2009 | |
| KR | 101004479 B1 | | 12/2010 | |
| WO | 2009045040 A2 | | 4/2009 | |
| WO | 2011158475 A1 | | 12/2011 | |
| WO | 2012028773 A1 | | 3/2012 | |

OTHER PUBLICATIONS

English Translation of "Notification Mod" enables a notification area to be pull down on the locked screen, Excite News, Japan, Android Smart, Nov. 9, 2013, 6 pages.

G. Hart-Davis, Teach Yourself Visually iPhone 5s and iPhone 5c, published Oct. 28, 2013, selected excerpts.

Satoru, T., "Considering whether to buy or not by Satoru TODA (toda satoru no kaukakawanuka shiannchu)", Nikkei PC 21, the December issue on 2013, Japan, Nikkei Business Publications, Inc., Oct. 24, 2013, vol. 18, No. 16, 7 pages.

Kazmucha, A., "How to access and start using Control Center," Retrieved from the Internet: URL:http://www.imore.com/how-to-access-and-start-using-ios-7-control-center [retrieved on Nov. 9, 2015], Sep. 23, 2013, 16 pages.

* cited by examiner

SIDE MENU DISPLAYING METHOD AND APPARATUS AND TERMINAL

CROSS-REFERENCE TO RELATED APPLICATIONS

This application is a continuation of U.S. patent application Ser. No. 14/586,325 filed on Dec. 30, 2014, which claims priority to International Patent Application No. PCT/CN2013/090980 filed on Dec. 30, 2013, which is hereby incorporated by reference in its entirety.

TECHNICAL FIELD

The present disclosure relates to the terminal field, and in particular, to a side menu displaying method and apparatus, and a terminal.

BACKGROUND

Touchscreens are usually adopted on screens of terminals such as a mobile phone, a tablet computer, and an eBook reader. To prevent a user from performing a misoperation on a touchscreen, a screen locking function is usually set on a terminal in a standby process, and an operation can be properly performed on the touchscreen only after the terminal is unlocked.

In a screen locking state, to make it convenient for the user to view a new message or perform a shortcut setting, the terminal usually provides a notification bar that is triggered and displayed by a downward sliding operation. A method for displaying the notification bar is: A terminal receives a sliding operation of sliding from the top of a screen downwards, which is triggered by a user; the terminal detects whether a sliding speed of the sliding operation exceeds a preset threshold; and if a detection result is that the sliding speed exceeds the preset threshold, that is, the sliding operation is a quick downward sliding operation, the terminal moves the notification bar from the top of the screen to the screen for displaying. Then, the user may view a new message or perform a shortcut setting on the notification bar, for example, quickly enabling/disabling BLUETOOTH, quickly enabling/disabling a wireless network, and adjusting brightness of the screen.

The inventor finds that the foregoing technology at least has the following problems: When a user places a terminal in a pocket, the terminal is likely to cause friction with a finger or skin of the user, and the friction is recognized by the terminal as a quick downward sliding operation. This causes triggering and displaying of the notification bar unknown to the user, and thereby causing a misoperation to occur.

SUMMARY

To resolve the problem, existing in other approaches, that a misoperation occurs because a notification bar is triggered and displayed unknown to a user, embodiments of the present disclosure provide a side menu displaying method and apparatus, and a terminal. Technical solutions are as follows:

A first aspect provides a side menu displaying method, where the method includes receiving a sliding operation of sliding starting from a side of a screen; detecting whether the sliding operation meets a predefined condition, where the predefined condition includes that a sliding speed of the sliding operation is greater than a preset threshold, and an end position of the sliding operation is not within a preset false touch area; and displaying a side menu corresponding to the side of the screen if a detection result is that the sliding operation meets the predefined condition.

In a first possible implementation manner of the first aspect, before the detecting whether the sliding operation meets a predefined condition, the method further includes detecting whether the end position of the sliding operation is within a direct display area, where the direct display area and the false touch area do not mutually overlap; and performing the step of detecting whether the sliding operation meets a predefined condition if a detection result is that the end position is not within the direct display area.

With reference to the first aspect or the first possible implementation manner of the first aspect, in a second possible implementation manner of the first aspect, the detecting whether the sliding operation meets a predefined condition includes, when the false touch area includes an area enclosed by the side of the screen, two sides adjacent to the side of the screen, and a first virtual side parallel with the side of the screen, detecting whether a vertical distance between the end position of the sliding operation and the side of the screen is greater than a false touch threshold, where the false touch threshold is a distance between the side of the screen and the first virtual side; and detecting whether the sliding speed of the sliding operation is greater than the preset threshold if a detection result is that the vertical distance is greater than the false touch threshold.

With reference to the first possible implementation manner of the first aspect, in a third possible implementation manner of the first aspect, the detecting whether the end position of the sliding operation is within a direct display area includes, when the direct display area includes an area enclosed by an opposite side of the side of the screen, two sides adjacent to the side of the screen, and a second virtual side parallel with the side of the screen, detecting whether a vertical distance between the end position of the sliding operation and the side of the screen is greater than a direct display threshold, where the direct display threshold is a distance between the side of the screen and the second virtual side, and the direct display threshold is greater than a false touch threshold.

With reference to the first aspect, in a fourth possible implementation manner of the first aspect, after the displaying a side menu corresponding to the side of the screen, the method further includes recording, in a successful triggering sample library, the sliding operation that successfully triggers displaying of the side menu this time, where a sliding operation that successfully triggers displaying of the side menu each time and an end position of each sliding operation are recorded in the successful triggering sample library; and updating a size and/or a location of the false touch area at a preset time interval according to distribution density of the end positions of the sliding operations on the screen, where the end positions are recorded in the successful triggering sample library.

With reference to the fourth possible implementation manner of the first aspect, in a fifth possible implementation manner of the first aspect, the updating a size and/or a location of the false touch area at a preset time interval according to distribution density of the end positions of the sliding operations on the screen, where the end positions are recorded in the successful triggering sample library, includes dividing a predefined area on the screen into at least two subareas, where the predefined area includes an area enclosed by the side of the screen, two sides adjacent to the side of the screen, and a third virtual side parallel with the side of the screen; collecting statistics on distribution density of the end positions of the sliding operations in each subarea, where the end positions are recorded in the successful triggering sample library; and determining a subarea in which the distribution density is lower than preset density as the false touch area.

A second aspect provides a side menu displaying apparatus, where the apparatus includes an operation receiving module, configured to receive a sliding operation of sliding starting from a side of a screen; an operation detecting module, configured to detect whether the sliding operation meets a predefined condition, where the predefined condition includes that a sliding speed of the sliding operation is greater than a preset threshold, and an end position of the sliding operation is not within a preset false touch area; and a menu displaying module, configured to display a side menu corresponding to the side of the screen if a detection result is that the sliding operation meets the predefined condition.

In a first possible implementation manner of the second aspect, the apparatus further includes a direct detecting module, configured to detect whether the end position of the sliding operation is within a direct display area, where the direct display area and the false touch area do not mutually overlap; and the operation detecting module, configured to perform the step of detecting whether the sliding operation meets a predefined condition if a detection result is that the end position is not within the direct display area.

With reference to the second aspect or the first possible implementation manner of the second aspect, in a second possible implementation manner of the second aspect, the operation detecting module includes a distance detecting unit and a speed detecting unit, where the distance detecting unit is configured to, when the false touch area includes an area enclosed by the side of the screen, two sides adjacent to the side of the screen, and a first virtual side parallel with the side of the screen, detect whether a vertical distance between the end position of the sliding operation and the side of the screen is greater than a false touch threshold, where the false touch threshold is a distance between the side of the screen and the first virtual side; and the speed detecting unit is configured to detect whether the sliding speed of the sliding operation is greater than the preset threshold if a detection result is that the vertical distance is greater than the false touch threshold.

With reference to the first possible implementation manner of the second aspect, in a third possible implementation manner of the second aspect: the direct detecting module is configured to, when the direct display area includes an area enclosed by an opposite side of the side of the screen, two sides adjacent to the side of the screen, and a second virtual side parallel with the side of the screen, detect whether a vertical distance between the end position of the sliding operation and the side of the screen is greater than a direct display threshold, where the direct display threshold is a distance between the side of the screen and the second virtual side, and the direct display threshold is greater than a false touch threshold.

With reference to the second aspect, in a fourth possible implementation manner of the second aspect, the apparatus further includes an operation recording module, configured to record, in a successful triggering sample library, the sliding operation that successfully triggers displaying of the side menu this time, where a sliding operation that successfully triggers displaying of the side menu each time and an end position of each sliding operation are recorded in the successful triggering sample library; and an area updating module, configured to update a size and/or a location of the false touch area at a preset time interval according to distribution density of the end positions of the sliding operations on the screen, where the end positions are recorded in the successful triggering sample library.

With reference to the fourth possible implementation manner of the second aspect, in a fifth possible implementation manner of the second aspect, the area updating module includes an area dividing unit, a density statistics collecting unit, and an area determining unit, where the area dividing unit is configured to divide a predefined area on the screen into at least two subareas, where the predefined area includes an area enclosed by the side of the screen, two sides adjacent to the side of the screen, and a third virtual side parallel with the side of the screen; the density statistics collecting unit is configured to collect statistics on distribution density of the end positions of the sliding operations in each subarea, where the end positions are recorded in the successful triggering sample library; and the area determining unit is configured to determine a subarea in which the distribution density is lower than preset density as the false touch area.

A third aspect provides a terminal, where the terminal includes the side menu displaying apparatus, for example, according to any one of the second aspect and the possible implementation manners of the second aspect.

A fourth aspect provides a terminal, where the terminal includes a memory, and one or more programs, where the one or more programs are stored in the memory and executed, after configuration, by one or more processors, where the one or more programs include an instruction used for performing the following operations: receiving a sliding operation of sliding starting from a side of a screen; detecting whether the sliding operation meets a predefined condition, where the predefined condition includes that a sliding speed of the sliding operation is greater than a preset threshold, and an end position of the sliding operation is not within a preset false touch area; and displaying a side menu corresponding to the side of the screen if a detection result is that the sliding operation meets the predefined condition.

In a first possible implementation manner of the fourth aspect, the memory further includes an instruction used for performing the following operations: detecting whether the end position of the sliding operation is within a direct display area, where the direct display area and the false touch area do not mutually overlap; and performing the step of detecting whether the sliding operation meets a predefined condition if a detection result is that the end position is not within the direct display area.

With reference to the fourth aspect or the first possible implementation manner of the fourth aspect, in a second possible implementation manner of the fourth aspect, the memory further includes an instruction used for performing the following operations: when the false touch area includes an area enclosed by the side of the screen, two sides adjacent to the side of the screen, and a first virtual side parallel with the side of the screen, detecting whether a vertical distance between the end position of the sliding operation and the side of the screen is greater than a false touch threshold, where the false touch threshold is a distance between the side of the screen and the first virtual side; and detecting whether the sliding speed of the sliding operation is greater than the preset threshold if a detection result is that the vertical distance is greater than the false touch threshold.

With reference to the first possible implementation manner of the fourth aspect, in a third possible implementation manner of the fourth aspect, the memory further includes an instruction used for performing the following operations: when the direct display area includes an area enclosed by an opposite side of the side of the screen, two sides adjacent to the side of the screen, and a second virtual side parallel with the side of the screen, detecting whether a vertical distance between the end position of the sliding operation and the side of the screen is greater than a direct display threshold, where the direct display threshold is a distance between the side of the screen and the second virtual side, and the direct display threshold is greater than a false touch threshold.

With reference to the fourth aspect, in a fourth possible implementation manner of the fourth aspect, the memory further includes an instruction used for performing the following operations: recording, in a successful triggering sample library, the sliding operation that successfully triggers displaying of the side menu this time, where a sliding operation that successfully triggers displaying of the side menu each time and an end position of each sliding operation are recorded in the successful triggering sample library; and updating a size and/or a location of the false touch area at a preset time interval according to distribution density of the end positions of the sliding operations on the screen, where the end positions are recorded in the successful triggering sample library.

With reference to the fourth possible implementation manner of the fourth aspect, in a fifth possible implementation manner of the fourth aspect, the memory further includes an instruction used for performing the following operations: dividing a predefined area on the screen into at least two subareas, where the predefined area includes an area enclosed by the side of the screen, two sides adjacent to the side of the screen, and a third virtual side parallel with the side of the screen; collecting statistics on distribution density of the end positions of the sliding operations in each subarea, where the end positions are recorded in the successful triggering sample library; and determining a subarea in which the distribution density is lower than preset density as the false touch area.

Beneficial effects of the technical solutions provided in the embodiments of the present disclosure are as follows:

A sliding operation of sliding starting from a side of a screen is received, whether the sliding operation meets a predefined condition is detected, and a side menu corresponding to the side of the screen is displayed when a detection result is that the sliding operation meets the predefined condition. The predefined condition includes that a sliding speed of the sliding operation is greater than a preset threshold, and an end position of the sliding operation is not within a preset false touch area. This solves the problem, existing in the other approaches, that a misoperation occurs because a notification bar is triggered and displayed unknown to a user, and achieves an effect that a side menu is triggered and displayed only when a sliding operation is a quick sliding operation and an end position of the sliding operation is not within a false touch area, thereby preventing a misoperation that occurs because the side menu is triggered and displayed unknown to a user.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes embodiments of the present disclosure in detail with reference to the accompanying drawings.

In the embodiments of the present disclosure, a terminal may be a mobile phone, a tablet computer, an eBook reader, a Moving Picture Experts Group audio layer-3 (MP3) player, a Moving Picture Experts Group audio layer-4 (MP4) player, and the like.

Figure 1:
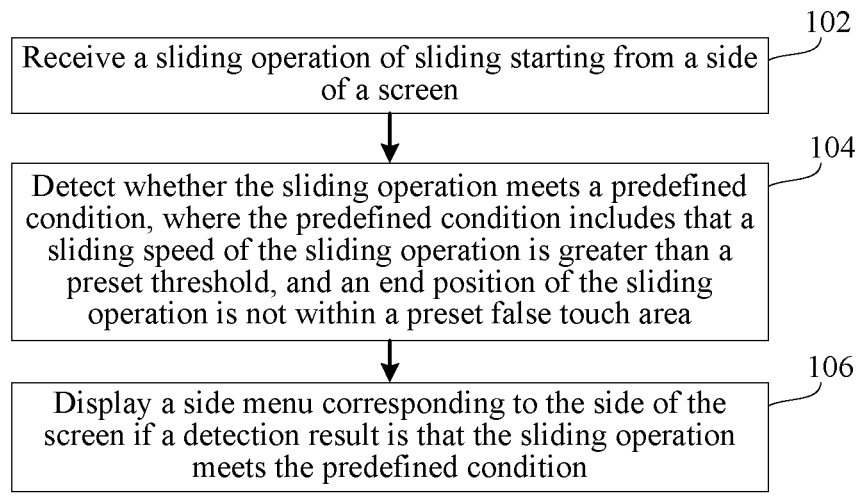
FIG. 1 is a method flowchart of a side menu displaying method according to an embodiment of the present disclosure.

FIG. 1 shows a method flowchart of a side menu displaying method according to an embodiment of the present disclosure. The side menu displaying method is applied to a terminal. The side menu displaying method includes the following steps:

Step 102: Receive a sliding operation of sliding starting from a side of a screen.

The terminal receives the sliding operation of sliding starting from the side of the screen. The side of the screen refers to an edge of the screen of the terminal. Using a rectangle screen as an example, the side of the screen may be any one of four sides of the rectangle screen.

Step 104: Detect whether the sliding operation meets a predefined condition, where the predefined condition includes that a sliding speed of the sliding operation is greater than a preset threshold, and an end position of the sliding operation is not within a preset false touch area.

The terminal detects whether the sliding operation meets the predefined condition. The terminal detects whether the sliding speed of the sliding operation is greater than the preset threshold, that is, detects whether the sliding operation is a quick sliding operation. In addition, the false touch area refers to an area in which a side menu is likely to be triggered and displayed unknown to a user. The false touch area may be a preset area with a fixed scope and may also be an area with a scope that is dynamically adjusted by recording a user operation. The side menu may include a notification bar or menu bar that is displayed by pulling down, and may further include a notification bar or menu bar that is displayed by pulling left or right, and a notification bar or menu bar that is displayed by pulling up.

Step 106: Display a side menu corresponding to the side of the screen if a detection result is that the sliding operation meets the predefined condition.

If the detection result is that the sliding operation meets the predefined condition, the terminal displays the side menu corresponding to the side of the screen. When a detection result is that the sliding speed of the sliding operation is greater than the preset threshold, and the end position of the sliding operation is not within the preset false touch area, the terminal displays the side menu corresponding to the side of the screen In conclusion, in the side menu displaying method provided in the embodiment, a sliding operation of sliding starting from a side of a screen is received, whether the sliding operation meets a predefined condition is detected, and a side menu corresponding to the side of the screen is displayed when a detection result is that the sliding operation meets the predefined condition. The predefined condition includes that a sliding speed of the sliding operation is greater than a preset threshold, and an end position of the sliding operation is not within a preset false touch area. This resolves the problem, existing in the other approaches, that a misoperation occurs because a notification bar is triggered and displayed unknown to a user, and achieves an effect that a side menu is triggered and displayed only when a sliding operation is a quick sliding operation and an end position of the sliding operation is not within a false touch area, thereby preventing a misoperation that occurs because the side menu is triggered and displayed unknown to a user.

As introduced in the embodiment shown in FIG. 1, the false touch area may be a preset area with a fixed scope and may also be an area with a scope that is dynamically adjusted by recording a user operation. The following introduces and describes the foregoing two cases in detail in embodiments shown in FIG. 2A and FIG. 3A. First, in the embodiment shown in FIG. 2A, a false touch area is a preset area with a fixed scope.

Figure 2A:
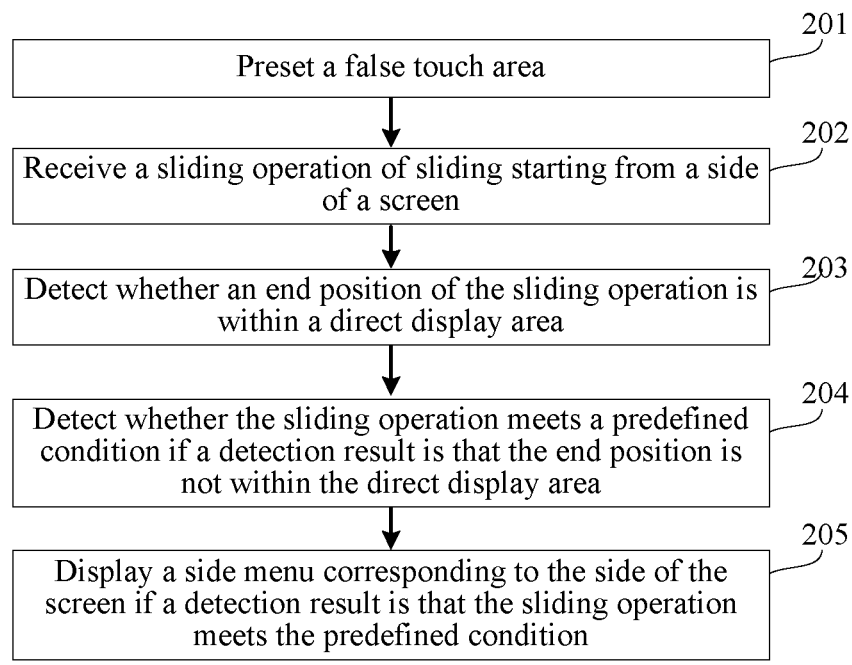
FIG. 2A is a method flowchart of a side menu displaying method according to another embodiment of the present disclosure.

FIG. 2A shows a method flowchart of a side menu displaying method according to another embodiment of the present disclosure. The side menu displaying method is applied to a terminal. The side menu displaying method includes the following steps:

Step 201: Preset a false touch area.

Figure 2B:
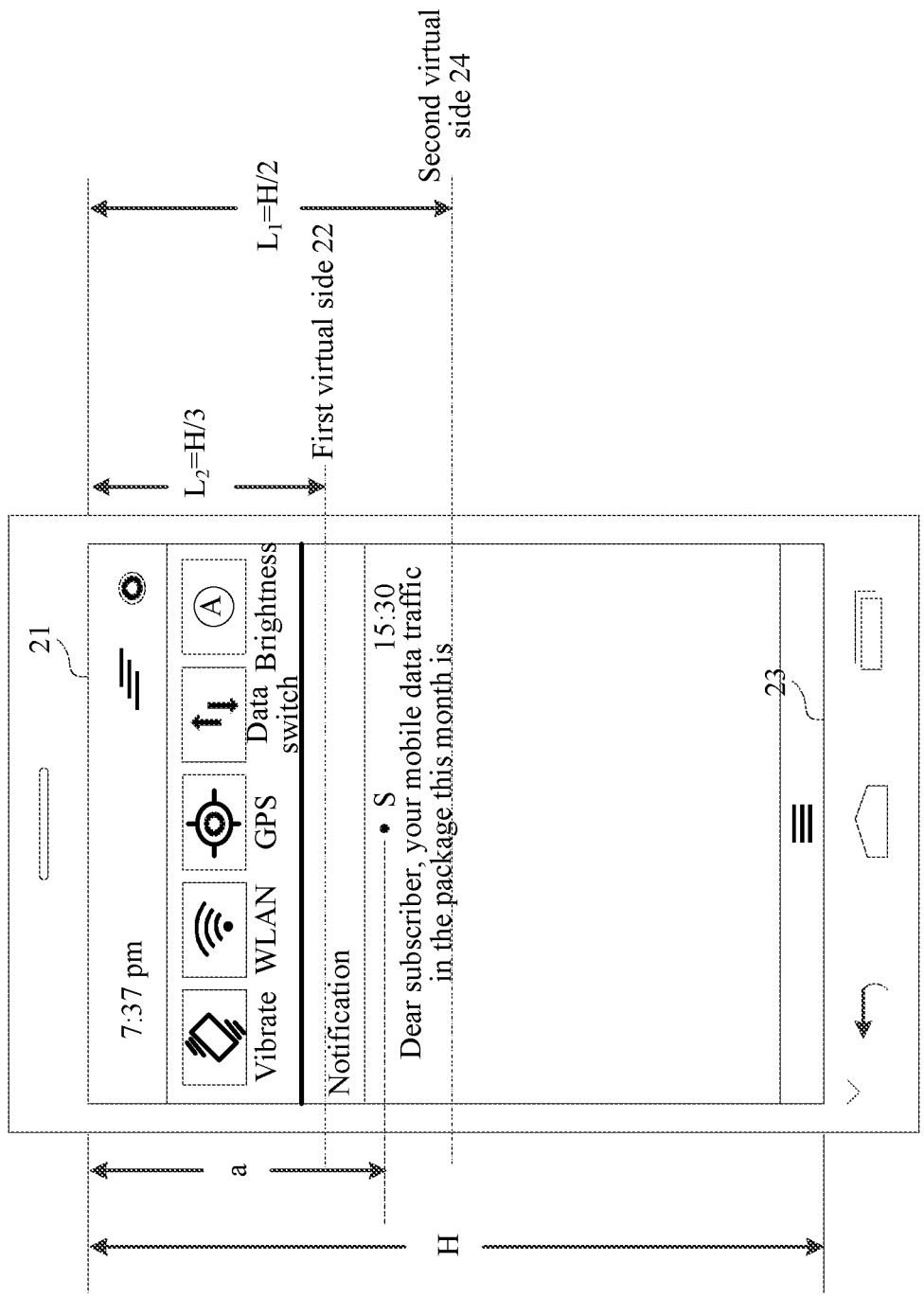
FIG. 2B is a schematic diagram of division of a false touch area involved in the side menu displaying method according to the another embodiment of the present disclosure.

The false touch area is preset on the terminal. In this embodiment, the false touch area is a preset area with a fixed scope. With reference to FIG. 2B, the false touch area includes an area enclosed by a side 21 of the screen, two sides adjacent to the side 21 of the screen, and a first virtual side 22 parallel with the side 21 of the screen.

The side 21 of the screen refers to an edge of the screen of the terminal. Using a rectangle screen as an example, the side 21 of the screen may be any one of four sides of the rectangle screen. In this embodiment, a top side of the rectangle screen shown in FIG. 2B is used as an example of the side 21 of the screen.

Step 202: Receive a sliding operation of sliding starting from a side of a screen.

The terminal receives the sliding operation of sliding starting from the side 21 of the screen.

Step 203: Detect whether an end position of the sliding operation is within a direct display area.

The terminal detects whether an end position S of the sliding operation is within the direct display area. With reference to FIG. 2B, the direct display area and the false touch area do not mutually overlap. The direct display area includes an area enclosed by an opposite side 23 of the side 21 of the screen, two sides adjacent to the side 21 of the screen, and a second virtual side 24 parallel with the side 21 of the screen.

The terminal detects whether a vertical distance a between the end position S of the sliding operation and the side 21 of the screen is greater than a direct display threshold $L_1$, where the direct display threshold $L_1$ is a distance between the side 21 of the screen and the second virtual side 24. The terminal may set up a coordinate system on the screen in advance. The terminal first acquires coordinates of the end position S of the sliding operation, then obtains the vertical distance a between the end position S and the side 21 of the screen according to the coordinates of the end position S, and finally, compares the vertical distance a with the direct display threshold $L_1$.

A value of the direct display threshold $L_1$ is related to a length of a side adjacent to the side 21 of the screen. Generally, the direct display threshold $L_1$ is set to half of the length of the side adjacent to the side 21 of the screen. As shown in FIG. 2B, in this embodiment, it is assumed that the direct display threshold $L_1$ is half of a length H of the screen.

If a detection result is that the end position S is within the direct display area, the terminal directly displays a side menu corresponding to the side 21 of the screen. The side menu may include a notification bar or menu bar that is displayed by pulling down, and may further include a notification bar or menu bar that is displayed by pulling left or right, and a notification bar or menu bar that is displayed by pulling up. In this embodiment, it is assumed that the side menu is a notification bar that is displayed by pulling down. With reference to FIG. 2B, an area below the line of the second virtual side 24, that is, the direct display area, is considered as an area in which a user intents to perform an operation. When the sliding operation starts from the side 21 of the screen downwards and stops below the line of the second virtual side 24, the terminal considers that the sliding operation is an intentional user operation. In this case, regardless of a sliding speed of the sliding operation, the terminal displays the side menu.

If a detection result is that the end position S is not within the direct display area, step 204 is performed.

Step 204: Detect whether the sliding operation meets a predefined condition if a detection result is that the end position is not within the direct display area.

If the detection result is that the end position is not within the direct display area, the terminal detects whether the sliding operation meets the predefined condition. The predefined condition includes that the sliding speed of the sliding operation is greater than a preset threshold, and the end position of the sliding operation is not within the preset false touch area.

The step includes the following two substeps:

First, detect whether a vertical distance between the end position of the sliding operation and the side of the screen is greater than a false touch threshold.

The terminal detects whether the vertical distance a between the end position S of the sliding operation and the side 21 of the screen is greater than a false touch threshold $L_2$, where the false touch threshold $L_2$ is a distance between the side 21 of the screen and the second virtual side 22. A value of the false touch threshold $L_2$ is also related to a length of a side adjacent to the side 21 of the screen, and the false touch threshold $L_2$ is less than the direct display threshold $L_1$. Generally, the false touch threshold $L_2$ is set to approximately one third of the length of the side adjacent to the side 21 of the screen. As shown in FIG. 2B, in this embodiment, it is assumed that the false touch threshold $L_2$ is one third of the length H of the screen.

When the sliding operation starts from the side 21 of the screen downwards and stops before the sliding reaches below the line of the second virtual side 24, the terminal considers that the sliding operation may be an unintentional user operation. In this case, the terminal detects whether the vertical distance a between the end position S of the sliding operation and the side 21 of the screen is greater than the false touch threshold $L_2$, that is, detects whether the end position S of the sliding operation is within the false touch area.

Second, if a detection result is that the vertical distance is greater than the false touch threshold, detect whether the sliding speed of the sliding operation is greater than the preset threshold.

When the detection result is that the vertical distance is greater than the false touch threshold $L_2$, the predefined condition that the end position S of the sliding operation is not within the preset false touch area is met. In this case, the terminal continues to detect whether the sliding speed of the sliding operation is greater than the preset threshold.

The sliding speed may be expressed in the number of pixels that are slid per unit time. A higher sliding speed indicates that more pixels are slid per unit time; on the contrary, a lower sliding speed indicates that less pixels are slid per unit time.

In the foregoing first and second substeps, when a detection result is that the vertical distance a between the end position S of the sliding operation and the side 21 of the screen is less than the false touch threshold $L_2$, or when the detection result is that the vertical distance a between the end position S of the sliding operation and the side 21 of the screen is greater than the false touch threshold $L_2$ but the sliding speed is less than the preset threshold, the sliding operation does not meet the predefined condition, and in this case, the terminal does not display the side menu. On the contrary, when the detection result is that the vertical distance a between the end position S of the sliding operation and the side 21 of the screen is greater than the false touch threshold $L_2$ and the sliding speed is greater than the preset threshold, the sliding operation meets the predefined condition, and the terminal performs step 205.

Step 205: Display a side menu corresponding to the side of the screen if a detection result is that the sliding operation meets the predefined condition.

If the detection result is that the sliding operation meets the predefined condition, the terminal displays the side menu corresponding to the side 21 of the screen. The terminal displays the side menu in the following two possible implementation manners:

In a first possible implementation manner, the terminal displays the side menu only after determining that the sliding operation meets a condition for displaying the side menu.

In a second possible implementation manner, when receiving the sliding operation of sliding starting from the side of the screen, the terminal moves the side menu along with a trigger object such as a finger of the user, and completely displays the side menu after determining that the sliding operation meets a condition for displaying the side menu, or otherwise withdraws the menu.

In conclusion, this embodiment provides two manners for triggering and displaying the side menu: first, the vertical distance a between the end position S of the sliding operation and the side 21 of the screen is greater than the direct display threshold $L_1$; second, the vertical distance a between the end position S of the sliding operation and the side 21 of the screen is less than the direct display threshold $L_1$, but is greater than the false touch threshold $L_2$, that is, the end position S of the sliding operation is not within the preset false touch area and the sliding speed of the sliding operation is greater than the preset threshold.

It should be noted that, before step 203, the following step may further be included. The terminal detects whether a vertical distance between a start position of the sliding operation and the side of the screen is greater than a trigger threshold, where the trigger threshold is less than the false touch threshold; if a detection result is that the vertical distance between the start position of the sliding operation and the side of the screen is less than the trigger threshold, step 203 is performed; otherwise, no operation is performed. The trigger threshold is generally set to approximately one twentieth of a length of a side adjacent to the side of the screen. Setting the trigger threshold is to determine whether the start position of the sliding operation is within a trigger area between the side of the screen and the line of the trigger threshold. It is considered that the sliding operation is a sliding operation that is used to trigger and display the side menu only when the start position of the sliding operation is within the trigger area.

It should further be noted that the problem raised in the other approaches seems more notable after a floating touch technology is applied to a terminal. Therefore, in a screen locking state, the terminal can disable a floating touch function. A user can trigger displaying of a side menu only using a sliding operation with direct contact with a screen. Further, the terminal may further collect a distance between the screen and an obstacle in front of the screen using a distance sensor or collect a light intensity value of the front of a screen using a light intensity collector to analyze and determine whether the terminal is in a user operation state. When the distance between the screen and the obstacle in front of the screen is less than a predefined distance value or when the light intensity value of the front of the screen is less than a predefined light intensity value, it is considered that the terminal is not in the user operation state, and in this case, none of sliding operations received triggers displaying of a side menu.

In conclusion, in the side menu displaying method provided in the embodiment, a sliding operation of sliding starting from a side of a screen is received, whether the sliding operation meets a predefined condition is detected, and a side menu corresponding to the side of the screen is displayed when a detection result is that the sliding operation meets the predefined condition. The predefined condition includes that a sliding speed of the sliding operation is greater than a preset threshold, and an end position of the sliding operation is not within a preset false touch area. This resolves the problem, existing in the other approaches, that a misoperation occurs because a notification bar is triggered and displayed unknown to a user, and achieves an effect that a side menu is triggered and displayed only when a sliding operation is a quick sliding operation and an end position of the sliding operation is not within a false touch area, thereby preventing a misoperation that occurs because the side menu is triggered and displayed unknown to a user.

In addition, the embodiment provides a specific manner of determining a false touch area, that is, presetting an area with a fixed scope as a false touch area. In this embodiment, presetting a false touch area produces a good effect on shielding some unintentional sliding operations of a user.

In the following embodiment shown in FIG. 3A, a false touch area is an area that is dynamically adjusted by recording a user operation.

Figure 3A:
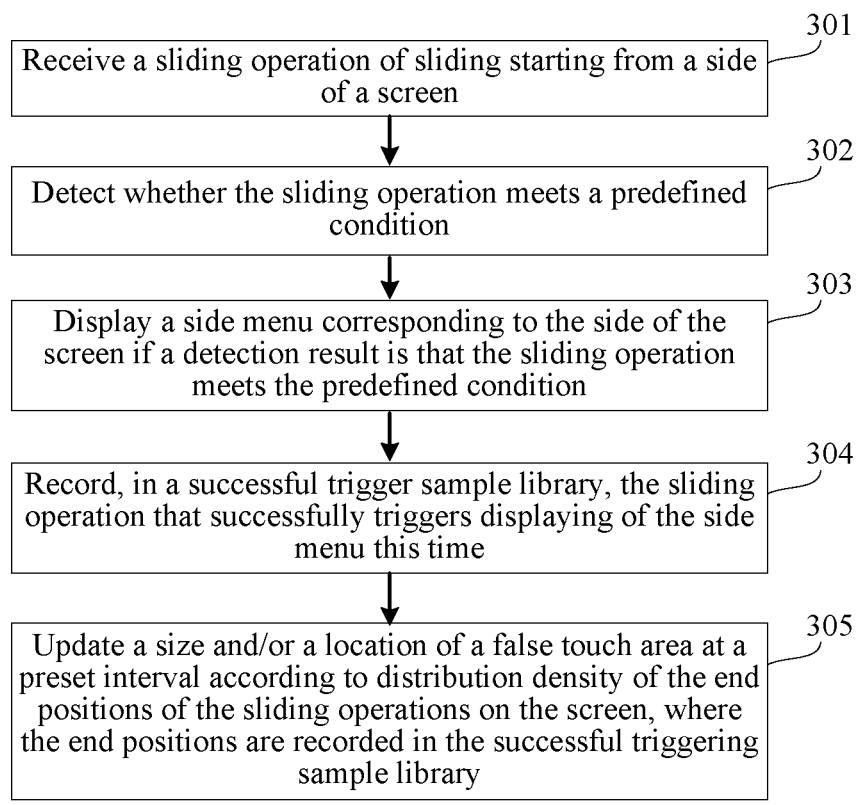
FIG. 3A is a method flowchart of a side menu displaying method according to still another embodiment of the present disclosure.

FIG. 3A shows a method flowchart of a side menu displaying method according to still another embodiment of the present disclosure. The side menu displaying method is applied to a terminal. The side menu displaying method includes the following steps:

Step 301: Receive a sliding operation of sliding starting from a side of a screen.

The terminal receives the sliding operation of sliding starting from the side of the screen.

Step 302: Detect whether the sliding operation meets a predefined condition.

Figure 3B:
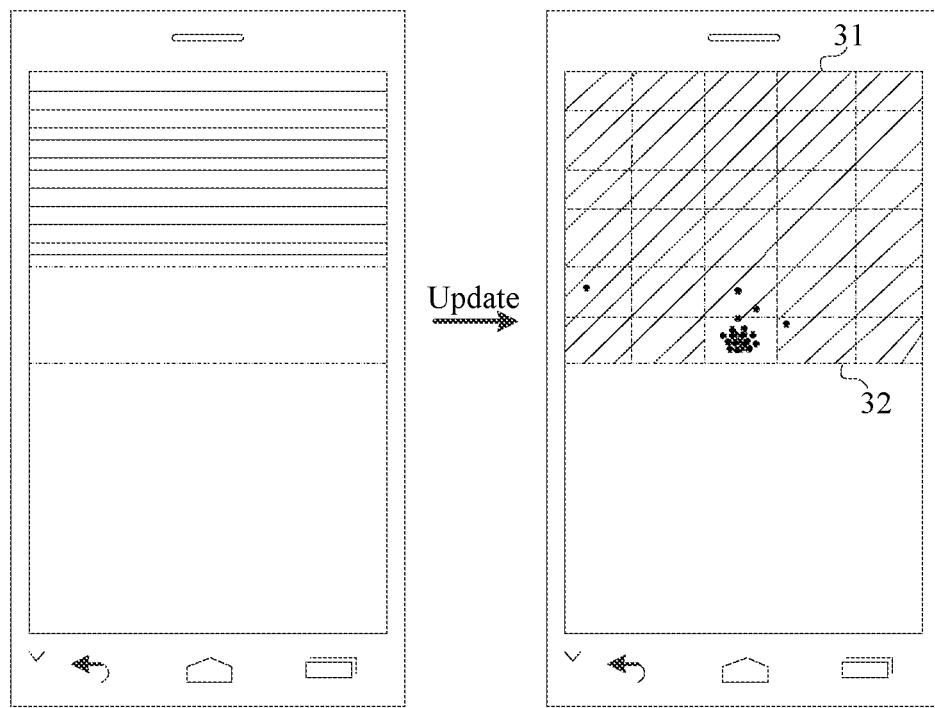
FIG. 3B is a schematic diagram of division of a false touch area involved in the side menu displaying method according to the still another embodiment of the present disclosure.

The terminal detects whether the sliding operation meets the predefined condition, where the predefined condition includes that a sliding speed of the sliding operation is greater than a preset threshold, and an end position of the sliding operation is not within a preset false touch area. With reference to the embodiment shown in FIG. 2B, in this embodiment, it is assumed that an initially set false touch area is an area of one third of a forepart of the screen, that is, an area above the line of the first virtual side 22 in the embodiment shown in FIG. 2B. As shown in FIG. 3B, an area indicated by transverse lines in the left figure is an initially set false touch area.

Step 303: Display a side menu corresponding to the side of the screen if a detection result is that the sliding operation meets the predefined condition.

If the detection result is that the sliding operation meets the predefined condition, the terminal displays the side menu corresponding to the side of the screen.

Step 304: Record, in a successful triggering sample library, the sliding operation that successfully triggers displaying of the side menu this time.

The terminal records, in the successful triggering sample library, the sliding operation that successfully triggers displaying of the side menu this time, where a sliding operation that successfully triggers displaying of the side menu each time and an end position of each sliding operation are recorded in the successful triggering sample library.

Step 305: Update a size and/or a location of a false touch area at a preset time interval according to distribution density of the end positions of the sliding operations on the screen, where the end positions are recorded in the successful triggering sample library.

The terminal updates the size and/or the location of the false touch area at the preset time interval according to distribution density of the end positions of the sliding operations on the screen, where the end positions are recorded in the successful triggering sample library. Because users have their own use habits, sliding operations, including tracks of the sliding operations, sliding distances, and end positions of the sliding operations, that the users perform on a terminal are the same or similar in most cases. The terminal may adjust the size and/or the location of the false touch area at the preset time interval according to the user habits, so that the false touch area is more precise, and probability of a misoperation is further reduced.

The step includes the following substeps:

First, divide a predefined area on the screen into at least two subareas.

The terminal divides the predefined area on the screen into at least two subareas. With reference to FIG. 3B, the predefined area includes an area enclosed by a side 31 of the screen, two sides adjacent to the side 31 of the screen, and a third virtual side 32 parallel with the side 31 of the screen. The terminal divides the predefined area on the screen into 6*5=30 subareas.

Second, collect statistics on distribution density of the end positions of the sliding operations in each subarea, where the end positions are recorded in the successful triggering sample library.

The terminal collects statistics on distribution density of the end positions of the sliding operations in each subarea, where the end positions are recorded in the successful triggering sample library. The terminal collects statistics on distribution density of end positions in each subarea after recording an end position of a sliding operation that successfully triggers displaying of the side menu each time. In this embodiment, it is assumed that distribution density of end positions of sliding operations that successfully trigger displaying of the side menu several times is shown in the right figure of FIG. 3B.

Third, determine a subarea in which distribution density is lower than preset density as a false touch area.

The terminal determines the subarea in which the distribution density is lower than the preset density as the false touch area. Because a subarea with higher distribution density is an area in which end positions of habitual sliding operations of a user are located, a subarea in which distribution density is higher than the preset density is determined as a non-false touch area. Accordingly, a subarea in which distribution density is lower than the preset density is determined as a false touch area. As shown in FIG. 3B, an area indicated by oblique lines in the right figure is an updated false touch area.

After step 304 and step 305, the terminal adjusts the false touch area at the preset time interval according to the user habit, so that the false touch area is more precise, and probability of a misoperation is further reduced. In an actual application, initially set false touch areas of a same batch of terminals before factory delivery are generally the same; however, after the terminals are used by different users for a period of time, updated false touch areas are different due to different user habits of the different users. The terminals have a function of adjusting, after learning a user habit, a size and/or a location of a false touch area.

In addition, in this embodiment, recording the end position of the sliding operation that successfully triggers displaying of the side menu each time is only used as an example for description. The terminal may also determine the size and/or the location of the false touch area by recording a track of the sliding operation that successfully triggers displaying of the side menu each time. Displaying of the side menu is triggered only when the track of the sliding operation is not within the false touch area.

In conclusion, in the side menu displaying method provided in the embodiment, a sliding operation of sliding starting from a side of a screen is received, whether the sliding operation meets a predefined condition is detected, and a side menu corresponding to the side of the screen is displayed when a detection result is that the sliding operation meets the predefined condition. The predefined condition includes that a sliding speed of the sliding operation is greater than a preset threshold, and an end position of the sliding operation is not within a preset false touch area. This resolves the problem, existing in the other approaches, that a misoperation occurs because a notification bar is triggered and displayed unknown to a user, and achieves an effect that a side menu is triggered and displayed only when a sliding operation is a quick sliding operation and an end position of the sliding operation is not within a false touch area, thereby preventing a misoperation that occurs because the side menu is triggered and displayed unknown to a user.

In addition, the embodiment provides another specific manner of determining a false touch area, that is, updating the size and/or the location of the false touch area by recording the sliding operation that successfully triggers displaying of the side menu each time, so that the false touch area becomes more precise.

The following is an apparatus embodiment of the present disclosure, and may be used to execute the method embodiment of the present disclosure. For details not disclosed in the apparatus embodiment of the present disclosure, refer to the method embodiment of the present disclosure.

Figure 4:
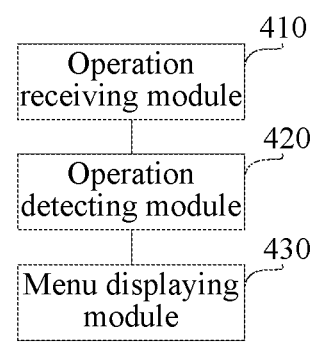
FIG. 4 is a structural block diagram of a side menu displaying apparatus according to an embodiment of the present disclosure.

FIG. 4 shows a structural block diagram of a side menu displaying apparatus according to an embodiment of the present disclosure. The side menu displaying apparatus may be implemented as a part or the whole of a terminal using software, hardware, or a combination of the software and the hardware. The side menu displaying apparatus includes an operation receiving module 410, an operation detecting module 420, and a menu displaying module 430.

The operation receiving module 410 is configured to receive a sliding operation of sliding starting from a side of a screen.

The operation detecting module 420 is configured to detect whether the sliding operation meets a predefined condition, where the predefined condition includes that a sliding speed of the sliding operation is greater than a preset threshold, and an end position of the sliding operation is not within a preset false touch area.

The menu displaying module 430 is configured to display a side menu corresponding to the side of the screen if a detection result is that the sliding operation meets the predefined condition.

In conclusion, with the side menu displaying apparatus according to the embodiment, a sliding operation of sliding starting from a side of a screen is received, whether the sliding operation meets a predefined condition is detected, and a side menu corresponding to the side of the screen is displayed when a detection result is that the sliding operation meets the predefined condition. The predefined condition includes that a sliding speed of the sliding operation is greater than a preset threshold, and an end position of the sliding operation is not within a preset false touch area. This resolves the problem, existing in the other approaches, that a misoperation occurs because a notification bar is triggered and displayed unknown to a user, and achieves an effect that a side menu is triggered and displayed only when a sliding operation is a quick flicking operation and an end position of the sliding operation is not within a false touch area, thereby preventing a misoperation that occurs because the side menu is triggered and displayed unknown to a user.

Figure 5:
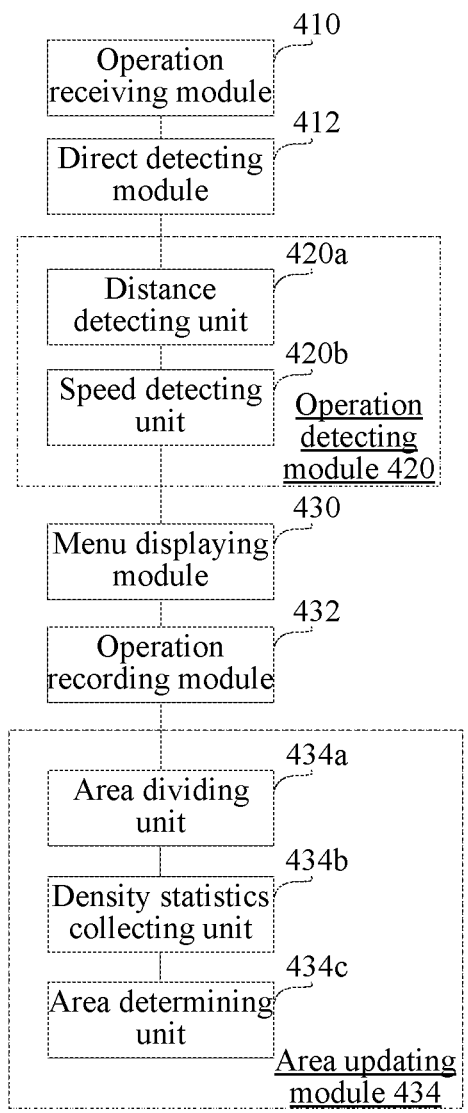
FIG. 5 is a structural block diagram of a side menu displaying apparatus according to another embodiment of the present disclosure.

FIG. 5 shows a structural block diagram of a side menu displaying apparatus according to another embodiment of the present disclosure. The side menu displaying apparatus may be implemented as a part or the whole of a terminal using software, hardware, or a combination of the software and the hardware. The side menu displaying apparatus includes an operation receiving module 410, a direct detecting module 412, an operation detecting module 420, a menu displaying module 430, an operation recording module 432, and an area updating module 434.

The operation receiving module 410 is configured to receive a sliding operation of sliding starting from a side of a screen.

The direct detecting module 412 is configured to detect whether an end position of the sliding operation is within a direct display area, where the direct display area and a false touch area do not mutually overlap.

The direct detecting module 412 is configured to, when the direct display area includes an area enclosed by an opposite side of the side of the screen, two sides adjacent to the side of the screen, and a second virtual side parallel with the side of the screen, detect whether a vertical distance between the end position of the sliding operation and the side of the screen is greater than a direct display threshold, where the direct display threshold is a distance between the side of the screen and the second virtual side, and the direct display threshold is greater than a false touch threshold.

The operation detecting module 420 is configured to detect whether the sliding operation meets a predefined condition, where the predefined condition includes that a sliding speed of the sliding operation is greater than a preset threshold, and an end position of the sliding operation is not within a preset false touch area.

The operation detecting module 420 is configured to perform the step of detecting whether the sliding operation meets a predefined condition if a detection result is that the end position is not within the direct display area.

The operation detecting module 420 includes a distance detecting unit 420a and a speed detecting unit 420b.

The distance detecting unit 420a is configured to, when the false touch area includes an area enclosed by the side of the screen, two sides adjacent to the side of the screen, and a first virtual side parallel with the side of the screen, detect whether a vertical distance between the end position of the sliding operation and the side of the screen is greater than the false touch threshold, where the false touch threshold is a distance between the side of the screen and the first virtual side.

The speed detecting unit 420b is configured to detect whether the sliding speed of the sliding operation is greater than the preset threshold if a detection result is that the vertical distance is greater than the false touch threshold.

The menu displaying module 430 is configured to display a side menu corresponding to the side of the screen if a detection result is that the sliding operation meets the predefined condition.

The operation recording module 432 is configured to record, in a successful triggering sample library, the sliding operation that successfully triggers displaying of the side menu this time, where a sliding operation that successfully triggers displaying of the side menu each time and an end position of each sliding operation are recorded in the successful triggering sample library.

The area updating module 434 is configured to update a size and/or a location of the false touch area at a preset time interval according to distribution density of the end positions of the sliding operations on the screen, where the end positions are recorded in the successful triggering sample library.

The area updating module 434 includes an area dividing unit 434a, a density statistics collecting unit 434b, and an area determining unit 434c.

The area dividing unit 434a is configured to divide a predefined area on the screen into at least two subareas, where the predefined area includes an area enclosed by the side of the screen, two sides adjacent to the side of the screen, and a third virtual side parallel with the side of the screen.

The density statistics collecting unit 434b is configured to collect statistics on distribution density of the end positions of the sliding operations in each subarea, where the end positions are recorded in the successful triggering sample library.

The area determining unit 434c is configured to determine a subarea in which the distribution density is lower than preset density as the false touch area.

In conclusion, with the side menu displaying apparatus according to the embodiment, a sliding operation of sliding starting from a side of a screen is received, whether the sliding operation meets a predefined condition is detected, and a side menu corresponding to the side of the screen is displayed when a detection result is that the sliding operation meets the predefined condition. The predefined condition includes that a sliding speed of the sliding operation is greater than a preset threshold, and an end position of the sliding operation is not within a preset false touch area. This resolves the problem, existing in the other approaches, that a misoperation occurs because a notification bar is triggered and displayed unknown to a user, and achieves an effect that a side menu is triggered and displayed only when a sliding operation is a quick sliding operation and an end position of the sliding operation is not within a false touch area, thereby preventing a misoperation that occurs because the side menu is triggered and displayed unknown to a user.

In addition, the embodiment provides two specific manners of determining a false touch area. First is presetting an area with a fixed scope as the false touch area. The false touch area produces a good effect on shielding a terminal from some unintentional sliding operations of a user. Second is updating a size and/or a location of the false touch area by recording a sliding operation that successfully triggers displaying of a side menu each time, so that the false touch area becomes more precise.

It should be noted that division of the foregoing function modules is taken as an example for illustration when the side menu displaying apparatus and the terminal that are provided in the embodiments are used for displaying a side menu. In an actual application, the foregoing functions may be allocated to different modules and implemented according to a requirement. That is, inner structures of the side menu displaying apparatus and the terminal are divided into different function modules to complete all or some of the functions described above. In addition, the side menu displaying apparatus and the terminal that are provided in the embodiments are based on a same idea as the side menu displaying method embodiment. For a specific implementation process, refer to the method embodiment, which is not described herein again.

Figure 6:
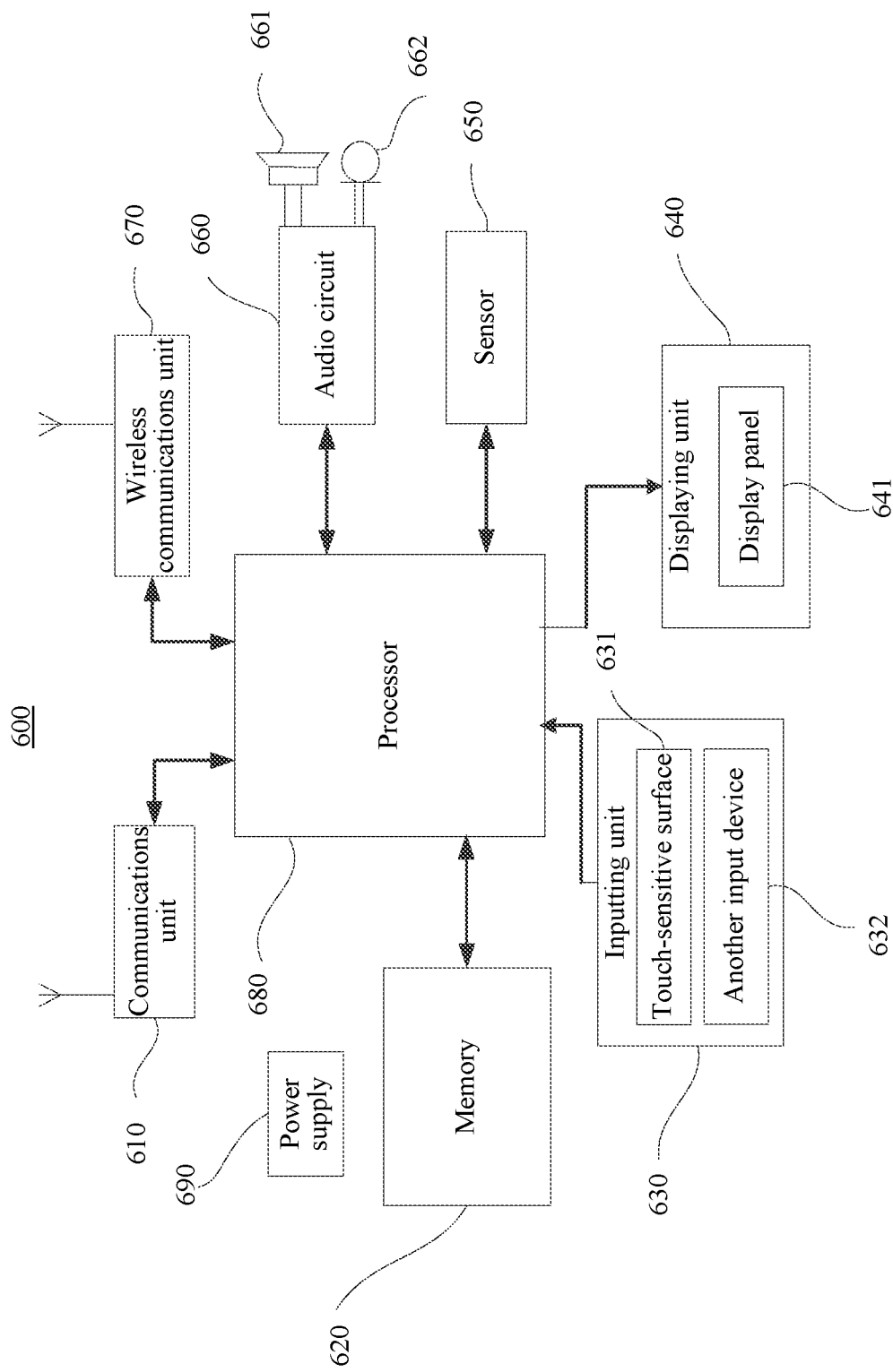
FIG. 6 is a schematic structural diagram of a terminal involved in the embodiments of the present disclosure.

FIG. 6 shows a schematic structural diagram of a terminal involved in embodiments of the present disclosure. The terminal may be used to implement the side menu displaying method provided in the foregoing embodiments.

The terminal 600 may include parts such as a communications unit 610, a memory 620 that includes one or more computer-readable storage media, an inputting unit 630, a displaying unit 640, a sensor 650, an audio circuit 660, a wireless communications unit 670, a processor 680 that includes one or more processing cores, and a power supply 690. A person killed in the art may understand that a structure of the terminal shown in FIG. 6 does not constitute a limitation on the terminal, parts more or less than those shown in FIG. 6 may be included, some parts may be combined, or the parts may be arranged in a different way.

The communications unit 610 may be configured to receive and send information, or during a call, receive and send a signal. The communications unit 610 may be a network communications device such as a radio frequency (RF) circuit, a router, or a modem. Particularly, when the communications unit 610 is an RF circuit, after downlink information of a base station is received, the downlink information is processed by one or more processors 680; in addition, related uplink data is sent to the base station. Generally, as a communications unit, the RF circuit includes but is not limited to an antenna, at least one amplifier, a tuner, one or more oscillators, a subscriber identity module (SIM) card, a transceiver, a coupler, an low noise amplifier (LNA), a duplexer, and the like. In addition, the communications unit 610 may communicate with a network and another device using wireless communications. The wireless communications may use any communications standard or protocol, including but not limited to Global System for Mobile Communications (GSM), General Packet Radio Service (GPRS), Code Division Multiple Access (CDMA), Wideband Code Division Multiple Access (WCDMA), Long Term Evolution (LTE), email, Short Messaging Service (SMS), and the like. The memory 620 may be configured to store a software program and a module, and the processor 680 executes, by running the software program and the module that are stored in the memory 620, various function applications and data processing. The memory 620 may mainly include a program storage area and a data storage area. The program storage area may store an operating system, an application program (such as a sound playing function or an image playing function) that is required by at least one function, and the like. The data storage area may store data (such as audio data or a phonebook) that is created according to use of the terminal 600, and the like. In addition, the memory 620 may include a high-speed random access memory, and may further include a non-volatile memory, for example, at least one disk storage device, a flash memory device, or another volatile solid-state storage device. Correspondingly, the memory 620 may further includes a storage controller, so as to provide the processor 680 and the inputting unit 630 with access to the memory 620.

The inputting unit 630 may be configured to receive input digital or character information, and produce signal input of a keyboard, a mouse, a joystick, or an optical or trackball signal, which are related to a user setting and function control. Preferably, the inputting unit 630 may include a touch-sensitive surface 631 and another input device 632. The touch-sensitive surface 631, also referred to as a touch-screen or a touchpad, may collect a touch operation (such as an operation that a user performs on the touch-sensitive surface 631 or near the touch-sensitive surface 631 using any suitable object or accessory such as a finger or a stylus) of a user on or near the touch-sensitive surface, and drives a corresponding connection apparatus according to a preset formula. Optionally, the touch-sensitive surface 631 may include two parts: a touch detecting apparatus and a touch controller. The touch detecting apparatus detects a touch location of a user, detects a signal brought by a touch operation, and sends the signal to the touch controller. The touch controller receives touch information from the touch detecting apparatus, converts the touch information into touch coordinates, and sends the touch coordinates to the processor 680, and can receive and execute a command sent from the processor 680. In addition, the touch-sensitive surface 631 may be implemented in multiple forms, such as a resistance type, a capacitor type, a infrared ray, and a surface acoustic wave. In addition to the touch-sensitive surface 631, the inputting unit 630 may further include another input device 632. Preferably, the another input device 632 may include but is not limited to one or more of a physical keyboard, a function key (such as a volume control key or a power key), a trackball, a mouse, a joystick, and the like.

The displaying unit 640 may be configured to display information input by a user, or information provided to a user, and various graphical user interfaces of the terminal 600, where the graphical user interfaces may be formed by a graphical image, a text, an icon, a video, and any combination thereof. The displaying unit 640 may include a display panel 641, and optionally, the display panel 641 may be configured in the form of a liquid crystal display (LCD), an organic light-emitting diode (OLED), and the like. Further, the touch-sensitive surface 631 may cover the display panel 641. When the touch-sensitive surface 631 detects a touch operation on or near the touch-sensitive surface 631, the touch-sensitive surface 631 sends a signal to the processor 680 to determine a type of a touch event, and then the processor 680 provides corresponding visual output on the display panel 641 according to the type of the touch event. Although the touch-sensitive surface 631 and the display panel 641 are used as two independent parts for implementing input and output functions in FIG. 6, in some embodiments, the touch-sensitive surface 631 may be integrated with the display panel 641 to implement the input and output functions.

The terminal 600 may further include at least one type of sensor 650, such as an optical sensor, a motion sensor, and other sensors. The optical sensor may include an ambient light sensor and a proximity sensor. The ambient light sensor may adjust brightness of the display panel 641 according to light and shade of ambient light rays, and the proximity sensor may turn off the display panel 641 and/or backlight when the terminal 600 is placed near an ear. As a type of motion sensor, a gravity acceleration sensor can detect magnitude of accelerations in various directions (generally, three axes), and can detect magnitude and a direction of the gravity when staying still, which may be applied to an application for recognizing a phone posture (such as landscape and portrait view switching, related games, and magnetometer posture calibration), a function related to vibration recognition (such as a pedometer, and a knock), and the like. For the terminal 600, a gyroscope, a barometer, a hygrometer, a thermometer, an infrared sensor, and other sensors may be further configured, which are not described in detail herein.

The audio circuit 660, a loudspeaker 661, and a microphone 662 can provide an audio interface between a user and the terminal 600. The audio circuit 660 may transmit, to the loudspeaker 661, an electrical signal converted from received audio data, and the loudspeaker 661 converts the electrical signal into a sound signal for output. In another aspect, the microphone 662 converts a collected sound signal into an electrical signal, the audio circuit 660 converts the electrical signal into audio data upon receipt of the electrical signal and outputs the audio data to the processor 680 for processing, and then the audio data is sent to, for example, another terminal, using the RF circuit 610, or the audio data is outputted to the memory 620 for further processing. The audio circuit 660 may further include an earphone jack, so as to provide an external earphone for communication with the terminal 600.

To implement wireless communications, the wireless communications unit 670 may be configured on the terminal. The wireless communications unit 670 may be a wireless fidelity (WI-FI) module. WI-FI belongs to a short-range wireless transmission technology. The terminal 600 may help, using the wireless communications unit 670, a user receive and send an email, browse a web page, access stream media, and the like. The wireless communications unit 670 provides a user with wireless broadband Internet access. Although FIG. 6 shows the wireless communications unit 670, it can be understood that the wireless communications unit 670 is not a must-have component of the terminal 600, and may be totally omitted according to a requirement within a scope of retaining the essence of the present disclosure.

The processor 680 is a control center of the terminal 600, is connected to each part of an entire mobile phone using various interfaces and lines, and executes various functions of the terminal 600 and processes data by running or executing a software program and/or a module stored in the memory 620 and by invoking data stored in the memory 620, so as to perform overall monitoring on the mobile phone. Optionally, the processor 680 may include one or more processing cores. Preferably, the processor 680 may integrate an application processor and a modem processor. The application processor mainly processes an operating system, a user interface, an application program, and the like, and the modem processor mainly processes wireless communications. It can be understood that the processor 680 may also not integrate the modem processor.

The terminal 600 further includes the power supply 690 (such as a battery) that supplies power to the parts. Preferably, the power supply may be logically connected to the processor 680 using a power management system, so as to implement, using the power management system, a management function such as management of charging, discharging, and power consumption. The power supply 690 may further include one or more direct current or alternating current power supplies, a rechargeable system, a power failure detection circuit, a power converter or an inverter, a power status indicator, and any other components.

Although not shown in FIG. 6, the terminal 600 may further include a camera, a BLUETOOTH module, and the like, which are not described in detail herein. In this embodiment, the terminal further includes a memory, and one or more programs, where the one or more programs are stored in the memory and executed, after configuration, by one or more processors. The one or more programs include an instruction used for executing the side menu displaying method provided in the embodiment shown in FIG. 1, FIG. 2A, or FIG. 3A in the present disclosure.

With descriptions of the foregoing embodiments, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or codes in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation. The computer-readable medium may include a random access memory (RAM), a read-only memory (ROM), an Electrically Erasable Programmable ROM (EEPROM), a compact disc ROM (CD-ROM), or another optical disc storage or a disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the present disclosure includes a compact disc (CD), a laser disc, an optical disc, a digital versatile disc (DVD), a floppy disk, and a BLU-RAY disc, where the disk generally copies data by a magnetic means, and the disc copies data optically by a laser means. The foregoing combination should also be included in the protection scope of the computer-readable medium.

It should be understood that the singular form "one" ("a", "an", "the") used in this specification is intended to further include a plural form unless the context clearly supports an otherwise case. It should further be understood that the "and/or" used in this specification refers to any one or all possible combinations of one or more related listed items.

Sequence numbers in the embodiments of the present disclosure are merely for illustrative purposes, and are intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A mobile terminal comprising:
   a memory comprising instructions; and
   a processor coupled to the memory, wherein the processor is configured to execute the instructions to cause the mobile terminal to:
      receive a sliding operation starting from a side of a touchscreen;
      move a side menu along the sliding operation in response to determining that a distance between a start position of the sliding operation and the side of the touchscreen is less than a trigger distance threshold, wherein the trigger distance threshold is a threshold distance from the side of the touchscreen, wherein the side menu comprises an icon, and wherein the icon is used to control at least one of: vibrate, wireless local area network (WLAN), Global Positioning System (GPS), data switch, or brightness;
      display the side menu adjacent to the side of the touchscreen in response to determining that a vertical distance between an end position of the sliding operation and the side of the touchscreen is less than a direct display threshold, greater than a false touch threshold, and a sliding speed of the sliding operation is greater than a preset threshold, wherein the false touch threshold is less than the direct display threshold, wherein the trigger distance threshold is less than the false touch threshold, and wherein the direct display threshold and false touch threshold are different threshold distances from the side of the touchscreen;
      withdraw the side menu when at least one of: the vertical distance between the end position of the sliding operation and the side of the touchscreen is less than the false touch threshold, or the sliding speed of the sliding operation is less than the preset threshold; and
      display the side menu adjacent to the side of the touchscreen in response to determining that the vertical distance between the end position of the sliding operation and the side of the touchscreen is greater than the direct display threshold.

2. The mobile terminal of claim 1, wherein the side of the touchscreen comprises a left side or a right side of the touchscreen.

3. The mobile terminal of claim 1, wherein the side of the touchscreen comprises a top side or a bottom side of the touchscreen.

4. The mobile terminal of claim 1, wherein the side menu is not displayed when the distance between the start position of the sliding operation and the side of the touchscreen is greater than the trigger distance threshold.

5. The mobile terminal of claim 1, wherein the side menu further comprises notification information, and wherein the notification information comprises a time related to a notification.

6. The mobile terminal of claim 1, wherein the side menu further comprises a second icon of an application, wherein the instructions further cause the mobile terminal to display a user interface of the application in response to a user operation, and wherein the user operation is received when displaying the icon of the application.

7. A computer program product comprising instructions stored on a non-transitory computer-readable medium that, when executed by a processor, cause a mobile terminal to:
   receive a sliding operation starting from a side of a touchscreen;
   move a side menu along the sliding operation in response to determining that a distance between a start position of the sliding operation and the side of the touchscreen is less than a trigger distance threshold, wherein the trigger distance threshold is a threshold distance from the side of the touchscreen, wherein the side menu comprises an icon, and wherein the icon is used to control at least one of: vibrate, wireless local area network (WLAN), Global Positioning System (GPS), data switch, or brightness;
   display the side menu adjacent to the side of the touchscreen in response to determining that a vertical distance between an end position of the sliding operation and the side of the touchscreen is less than a direct display threshold, greater than a false touch threshold, and a sliding speed of the sliding operation is greater than a preset threshold, wherein the false touch threshold is less than the direct display threshold, wherein the trigger distance threshold is less than the false touch threshold, and wherein the direct display threshold and false touch threshold are different threshold distances from the side of the touchscreen;
   withdraw the side menu when at least one of: the vertical distance between the end position of the sliding operation and the side of the touchscreen is less than the false touch threshold, or the sliding speed of the sliding operation is less than the preset threshold; and display the side menu adjacent to the side of the touchscreen in response to determining that the vertical distance between the end position of the sliding operation and the side of the touchscreen is greater than the direct display threshold.

8. The computer program product of claim 7, wherein the side of the touchscreen comprises a left side or a right side of the touchscreen.

9. The computer program product of claim 7, wherein the side of the touchscreen comprises a top side or a bottom side of the touchscreen.

10. The computer program product of claim 7, wherein the side menu is not displayed when the distance between the start position of the sliding operation and the side of the touchscreen is greater than the trigger distance threshold.

11. The computer program product of claim 7, wherein the side menu further comprises notification information, and wherein the notification information comprises a time related to a notification.

12. The computer program product of claim 7, wherein the side menu further comprises a second icon of an application, wherein the instructions further cause the mobile terminal to display a user interface of the application in response to a user operation, and wherein the user operation is received when displaying the icon of the application.

13. A mobile terminal comprising:
a memory comprising instructions; and
a processor coupled to the memory, wherein the processor is configured to execute the instructions to cause the mobile terminal to:
receive a sliding operation starting from a side of a touchscreen;
move a side menu along the sliding operation in response to determining that a distance between a start position of the sliding operation and the side of the touchscreen is less than a trigger distance threshold, wherein the trigger distance threshold is a threshold distance from the side of the touchscreen, wherein the side menu comprises an icon, and wherein the icon is used to control at least one of: vibrate, wireless local area network (WLAN), Global Positioning System (GPS), data switch, or brightness;
display the side menu adjacent to the side of the touchscreen in response to determining that a vertical distance between an end position of the sliding operation and the side of the touchscreen is less than a direct display threshold, greater than a false touch threshold, and a sliding speed of the sliding operation is greater than a preset threshold, wherein the false touch threshold is less than the direct display threshold, wherein the trigger distance threshold is less than the false touch threshold, and wherein the direct display threshold and false touch threshold are different threshold distances from the side of the touchscreen;
withdraw the side menu in response to determining that at least one of: the vertical distance between the end position of the sliding operation and the side of the touchscreen is less than the false touch threshold, or the sliding speed of the sliding operation is less than the preset threshold; and
display the side menu adjacent to the side of the touchscreen when the vertical distance between the end position of the sliding operation and the side of the touchscreen is greater than the direct display threshold.

14. The mobile terminal of claim 13, wherein the side menu further comprises a second icon of an application, wherein the processor is further configured to execute the instructions to cause the mobile terminal to display a user interface of the application in response to a user operation, and wherein the user operation is received when displaying the icon of the application.

15. The mobile terminal of claim 13, wherein the side of the touchscreen comprises at least one of a left side, a right side, a top side, or a bottom side of the touchscreen.

16. The mobile terminal of claim 13, wherein the side menu further comprises a notification information, and wherein the notification information comprises a time related to a notification.

17. The mobile terminal of claim 13, wherein the side menu is not displayed when the distance between the start position of the sliding operation and the side of the touchscreen is greater than the trigger distance threshold.

* * * * *